(12) United States Patent
Devenoges

(10) Patent No.: US 6,576,171 B1
(45) Date of Patent: Jun. 10, 2003

(54) MACHINE AND PROCESS FOR MOULDING BY STRETCHING AND BLOWING

(75) Inventor: Thierry Devenoges, Commugny (CH)

(73) Assignee: Tetra Laval Holdings & Finance SA, Pully (CH)

(*) Notice: Subject to any disclaimer, the term of this patent is extended or adjusted under 35 U.S.C. 154(b) by 0 days.

(21) Appl. No.: 09/646,863
(22) PCT Filed: Mar. 17, 1999
(86) PCT No.: PCT/IB99/00453
§ 371 (c)(1),
(2), (4) Date: Sep. 25, 2000
(87) PCT Pub. No.: WO99/48669
PCT Pub. Date: Sep. 30, 1999

(30) Foreign Application Priority Data

Mar. 25, 1998 (CH) .............................................. 0710/98

(51) Int. Cl.⁷ .......................... B29C 49/78; B29C 49/12
(52) U.S. Cl. ...................... 264/40.1; 264/531; 425/150; 425/529
(58) Field of Search ............................... 425/149, 150, 425/171, 529, 530; 264/40.1, 531, 532

(56) References Cited

U.S. PATENT DOCUMENTS 4,372,735 A * 2/1983 Collette ...................... 425/135
5,169,705 A * 12/1992 Coxhead et al. ............ 425/150
5,269,672 A * 12/1993 DiGangi, Jr. ............... 425/150

FOREIGN PATENT DOCUMENTS

| EP | 0499136 A3 | 8/1992 |
| FR | 2323516 | 4/1977 |
| JP | 6254955 | 9/1994 |
| JP | 9272147 | 10/1997 |
| WO | WO97136632 | 4/1997 |

* cited by examiner

Primary Examiner—Jill L. Heitbrink
Assistant Examiner—Monica A Fontaine
(74) Attorney, Agent, or Firm—Young & Thompson

(57) ABSTRACT

Machine for the production of receptacles of plastic. A stretching rod (32) is displaced by actuating means (69) comprising a servo-motor (72) whose operation is controlled by a controller installation (73) by means of an adjustment loop (75). The blowing air is introduced into the preform via a servo-valve (60) whose operation is also controlled by this installation (73) by means of an adjustment loop (76) which can be combined with the first adjustment loop (75). It is thus possible to control in a precise manner the process of transformation of a preform into a receptacle by means of curves of stretching and pressure increase. Calibration operations of the maximum path of the stretching rod as a function of the length of the mould cavities and calibration operations of the path of positioning of the stretching rod as a function of the preform can be carried out easily and in an automated fashion, thereby ensuring excellent safety of production and very high adaptability to all conditions of production.

12 Claims, 4 Drawing Sheets

MACHINE AND PROCESS FOR MOULDING BY STRETCHING AND BLOWING

The present invention relates to a machine for the production of receptacles of plastic material comprising a chassis and arranged along a transport path, at least one heating device and a device for moulding by stretching and blowing, the receptacles being formed from preforms disposed on supports, the device for moulding by stretching and blowing comprising a blowing member connected to a source of fluid under pressure by means of an electro-valve and a stretching rod adapted to be displaced by actuating means comprising a motor connected to a control installation comprising first regulating means to program and control the displacement of the stretching rod and second regulating means to program and control the pressure increase applied to the preforms. It also relates to a corresponding process.

The document WO97/13632 discloses a stretch blow moulding machine in which the stretching rod is displaced by the introduction of air under pressure into chambers of a pneumatic jack. This type of actuating means does not permit precise adjustment of the movements of the rod and easy modification of the laws controlling the displacements of this rod. There exists also machines provided with a cam acting on the stretching rod and which can thus determine a stretching curve as a function of time. This cam system however is very rigid and renders necessary for each new application and curve another cam with another suitable machining.

Document EP A-0,499,135 A2 discloses a machine with servo electric driven stretch rods of the type defined in the preamble of the independent claims. This machine is provided with means for determining the position of the stretch rod in their holding means channel and means for synchronizing the transmission of high pressure fluid to the preform based on the position of the stretch rod.

The aim of the present invention is to improve said known machine in particular as concerns its facilities of calibration to different moulds and preforms and to allow a high working precision and security even under changing conditions.

The machine according to the invention is characterized to this and by the fact that the control installation and its first regulating means are arranged so as to carry out a first calibration operation to determine the maximum path of the stretching rod as a function of the length of the mould cavity used, by advancing the stretching rod to the bottom of the mould cavity and by recording in the memory of the control installation the path obtained, decreased by the thickness of the bottom wall of the receptacle, and to carry out a second calibration operation to determine the path of positioning before stretching of the stretching rod as a function of the length of the preform, by advancing the stretching rod to the bottom of the preform and by recording in a memory of the control installation a value depending on the positioning path and variations in the length of the preforms.

By these characteristics, it is possible to obtain and control in a precise manner the calibration of the path of the stretching rod. These calibration operations may be made automatically and as frequently as necessary. Thus, thermal variations of the mould and all variations in the geometry of the preforms may be kept under surveillance and control. This allows to obtain a high working security and a constant high quality of the produced goods.

Favorably the first regulating means are adapted to predetermine a stretching function setting at least one parameter defining the stretching of the preform in relation to at least another parameter, advantageously the time, the second regulating means being adapted to predetermine at least one function of pressure increase and the control installation being adapted to provide a combination of said first and second regulating means.

By these characteristics, it is possible to be able to control in a precise manner the process of transformation of a preform into a receptacle or bottle. It is thus possible to pre-program and execute the stretching curves as a function of given parameters, such as time, and curves of pressure increase of the blowing air and to combine these curves so as to obtain a high quality of the products obtained. The invention permits very rapid adaptation of the machine to other uses, and other shapes and sizes of moulds and preforms. Moreover, the movements of the stretching rod are exactly controlled according to predetermined laws which can easily be modified, which permits avoiding damaging the moulding device and the preforms, obtaining a high safety during production, whilst conferring on the machine a great facility for adaptation and modification.

According to a preferred embodiment, the first regulating means of the control installation are arranged so as to pre-program the curves, functions and stretching laws having regard for the stretching path followed by the stretching rod and/or the stretching force exerted by the stretching rod as a function of time, constituting the other parameter, and then to carry out these curves, functions and stretching laws.

The stretching curves thus defined permit precise control of the formation of the receptacle.

Ideally, the control installation is arranged such that said combination of the first and second means permits programming the pre-blowing and/or blowing pressure curves as a function of the path or the position of the stretching rod and/or of the stretching force or of the resistance exerted on the stretching rod and then to carry them out.

With these characteristics, the control of stretching and the pre-blowing and blowing are carried out in such a way as to obtain receptacles having walls of high quality and precisely defined thickness.

Preferably, the first calibrating operation comprises a first step during which the stretching rod is advanced with reduced speed and stopped when it enters into contact with the bottom of the mould cavity, and a second step during which the rod is withdrawn by a first predetermined distance corresponding to the thickness of the wall of the bottom of the receptacle, the path thus obtained being recorded in the memory of the control installation.

Optimum calibration of the path of the stretching rod is thus obtained, which permits very precise production of receptacles, great safety and rapid adaptation of the machine.

Preferably, the second calibrating operation comprises a first step during which the stretching rod is advanced with reduced speed within the interior of the preform and stopped when it enters into contact with the bottom of the preform, and a second step during which the rod is withdrawn by a second predetermined distance, having regard to eventual deformation of the preform after its heating, the path thus obtained being recorded in the memory of the control installation.

These characteristics ensure reliable operation even in the case of preforms subjected to considerable deformation. Moreover, the machine automatically and rapidly adapts to all changes of dimension of the preforms.

According to a preferred embodiment, the motor is a servo-motor receiving from the control installation voltage and/or frequency and/or current signals and sending to the control installation current signals and/or signals relative to the position of the stretching rod.

Moreover, the electro-valve is preferably a servo-valve receiving from the control installation first voltage signals and sending to this installation second voltage signals.

These characteristics ensure a particularly certain and precise control of the execution of the production of the receptacles.

The invention also relates to a process for the production of receptacles of plastic material by means of a machine comprising a chassis and arranged along a transport path, at least one heating device and a device for moulding by stretching and blowing, the receptacles being formed from preforms disposed on supports, the device for moulding by stretching and blowing comprising a blowing member connected to a source of fluid under pressure by means of an electro-valve and a stretching rod adapted to be displaced by actuating means comprising a motor connected to a control installation comprising first regulating means to program and control the displacement of the stretching rod and second regulating means to program and control the pressure increase applied to the preforms, characterized by the fact that there is carried out by means of the control installation a first calibration operation to determine the maximum path of the stretching rod as a function of the length of the mould cavity by advancing the stretching rod to the bottom of the mould cavity and recording in the memory of the control installation the obtained path, decreased by the thickness of the bottom wall of the receptacle, and that there is carried out a second calibration operation to determine the path of positioning before stretching of the stretching rod as a function of the length of the preform by advancing the stretching rod to the bottom of the preform and by recording in a memory of the control installation a value depending on the positioning path and variations in the length of the preforms.

This process with a double calibration operation ensures high safety of production avoiding any damage to the moulds, the preforms, the produced receptacles, the stretching rods and other components. It permits very rapid and automated changing of moulds and preforms, without having to carry out substantial preliminary tests requiring a prolonged interruption of production.

Other advantages will appear from the characteristics set forth in the dependent claims and from the description hereafter, setting forth the invention in greater detail, with the help of drawings which show schematically and by way of example one embodiment.

Figure 1:
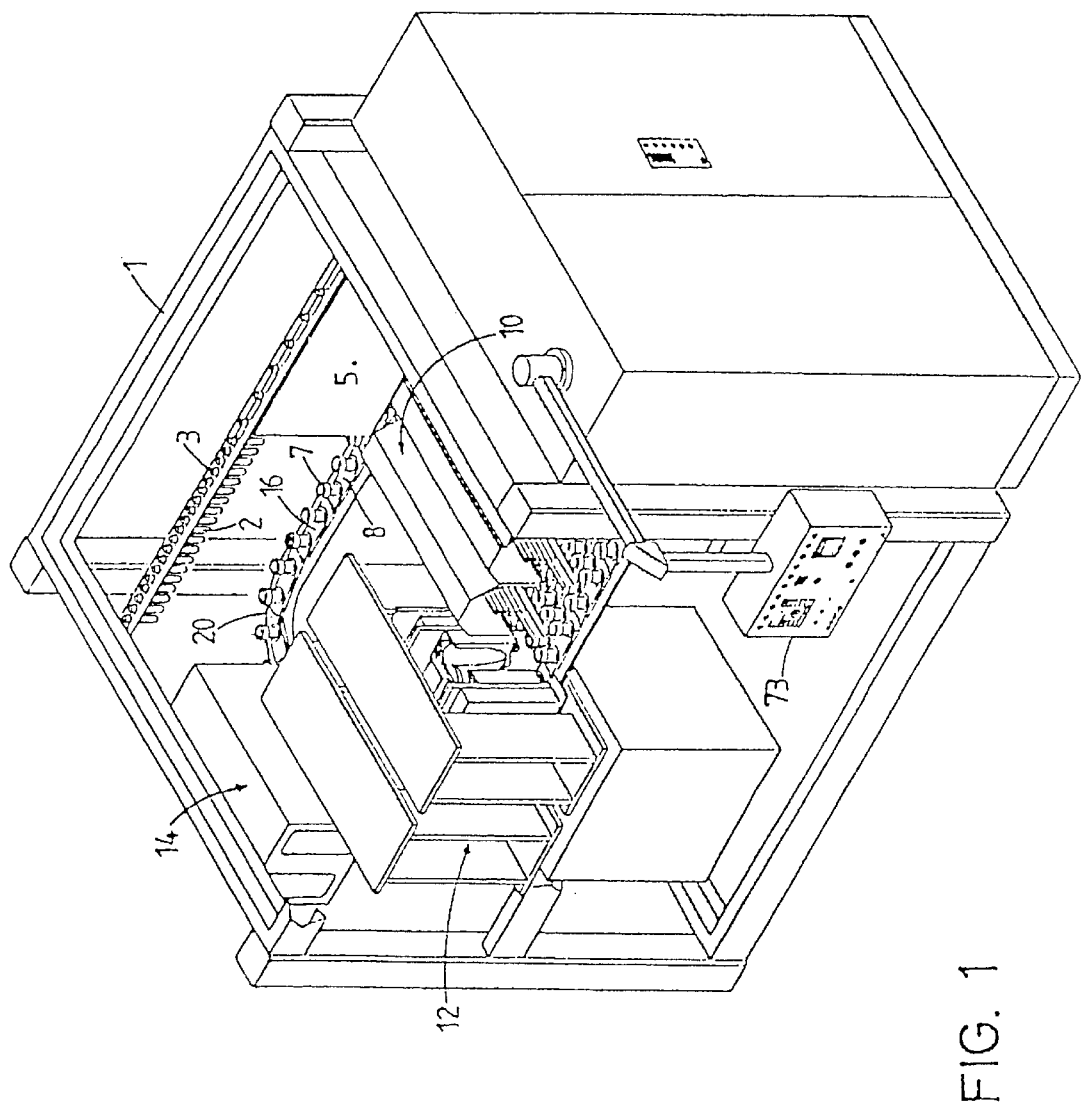
FIG. 1 is a perspective view of a machine for the production of receptacles of plastic material according to the invention.

With reference to FIG. 1, the machine for the production of receptacles of plastic material comprises a chassis 1 on which the different devices and members of the machine are mounted in modular manner. Preforms 2 for the receptacles to be produced are supplied by means of a double rail 3 forming an inclined plane to lead into an inverting loading device 5, in which the preforms are inverted and disposed neck down in supports 7 carried by double conveyors 8, each conveyor carrying two supports 7.

The preforms 2 are then heated in a heating device 10 and brought to a device 12 for moulding by stretching and blowing. After their formation, the produced receptacles are raised from the supports 7 in an inverting discharge device 14, from which they can be packaged for their future use. Alternatively, the receptacles could also be brought on the double conveyors 8 toward sterilization, filling, labelling, packaging stations, etc.

The empty supports 7 carried by the conveyors 8 are then brought to the loading device 5 for the preforms.

Figure 2:
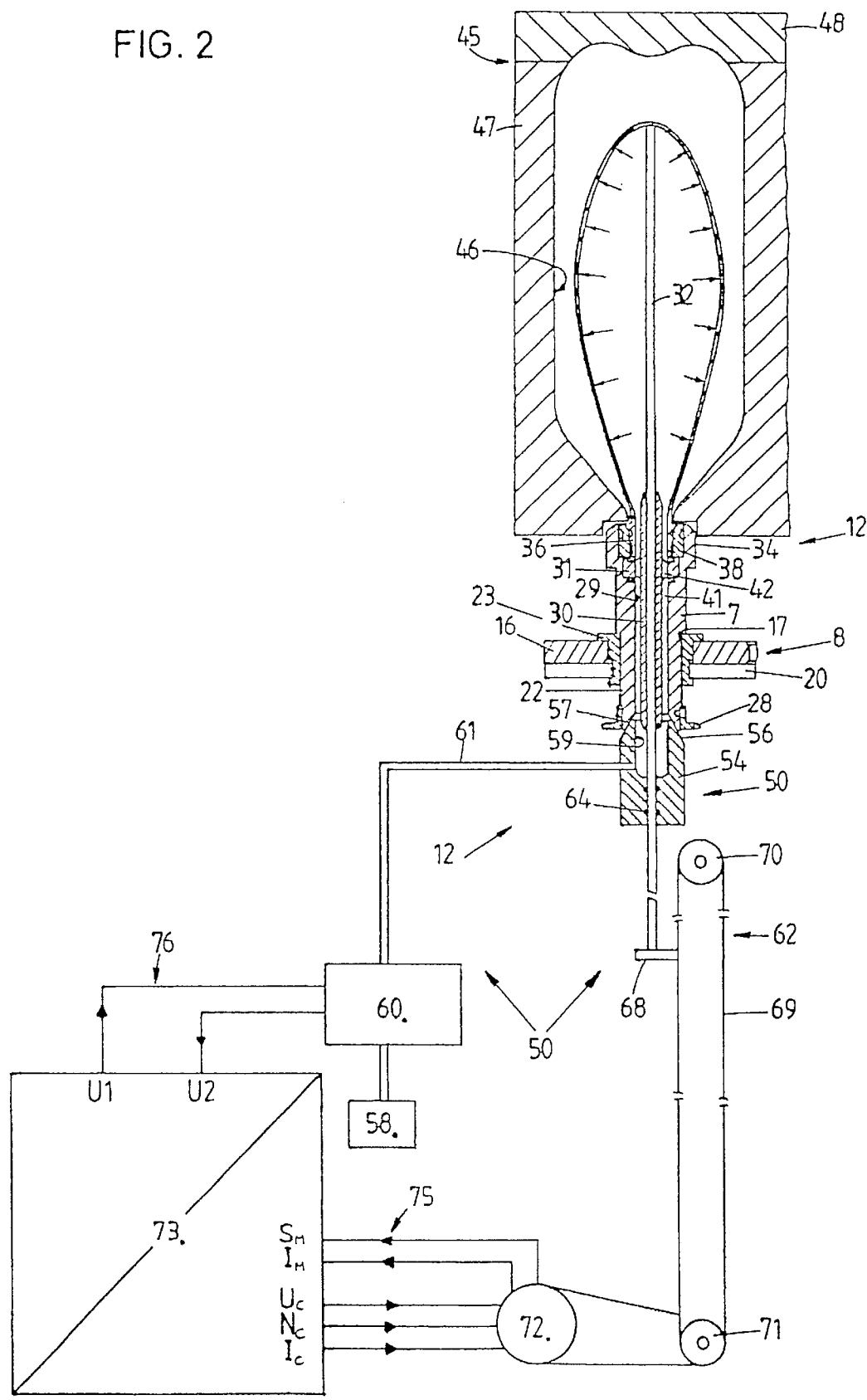
FIG. 2 shows a partial cross-sectional view of one embodiment of the moulding device by stretching and blowing, used in the machine shown in FIG. 1.

Referring to FIG. 2, the conveyors 8 are constituted by plates 16 of elongated rectangular shape with rounded ends comprising two recesses 17 of which only one is shown and in which the supports 7 are maintained axially. These plates 16 rest laterally on a continuous guide path 20 comprising two lateral rails and mutually touched to form a closed circuit. The displacement of the conveyors 8 on the guide path is obtained by pressure by means of jacks (not shown).

Each support 7 comprises a tubular body 22 retained axially on a bearing 23 engaging the recesses 17 of the plate 16. The plate 16 and the rails of the guide track 20 on which the plate 16 rests, are retained between two projections of the bearing 23. This construction permits very rapid mounting of the conveyors 8 and of the support 7 on the guide path 20, and ensures excellent guidance and maintenance of the conveyors 8 on the guide track 20.

The supports 7 are, at their lower end, secured to a drive pinion 28 adapted to coact with a pulley or a drive chain provided at the level of the heating device 10 to be driven in rotation about their central axis.

Each support 7 comprises a central recess 29 and is provided with a tubular guide piece 30 adapted to guide precisely a stretching rod 32 which is a part of the device 12 for moulding by stretching and blowing. The tubular guide piece 30 is secured to the interior wall of the support 7 by a securement ring 31 to which it is connected by radial bridges 42.

The support 7 has an upper portion 34 of larger diameter adapted to receive the neck 36 of a preform 2 disposed neck down in the support 7. A retaining ring 38 is moreover interposed between the neck 36 and the recess 35 and ensures securement on the preform 2 in the support 7.

A cylindrical space 41 of large cross-section is provided between the tubular guide member 30 and the internal wall of the support 7 and of the preform 2, permitting a large flow rate to act in blowing during stretching and blowing.

It is to be noted that the internal surfaces of the neck 36 of the preform 2, of the securement ring 31 and of the central bore 29 are substantially aligned to constitute with the tubular guide member said cylindrical blowing space 41.

The moulding device 12 by stretching and blowing comprises a moulding member 45 comprising a certain number of mould cavities 46, preferably two or three. This mould member 45 is constituted by two half-moulds 47 and a mould, 48. The lower portion of the two half-moulds 47 coact with the upper surface of the support 7 and with the neck 36 of the preform 2 to maintain the assembly in place during the operation of moulding by stretching and blowing.

In the lower portion of each moulding device 12 by stretching and blowing is arranged a blowing and stretching member 50 with a blowing nozzle 54 which can be displaced vertically by engagement means (not shown) from an active position as shown in FIG. 2, to an inactive position. This blowing nozzle 54 is provided with a conical front end 56 adapting it in the active position in sealed position to the lower end 57 of the corresponding shape of the tubular body 22 of the support 7. A blowing chamber 59 is, on the one hand, in communication with the source of fluid under pressure 58 by means of a servo-valve 60 and by a blowing conduit 61 and, on the other hand, with the cylindrical blowing space 41 such that the blowing fluid or air can enter at a large flow rate into the preform 2 and the receptacle which is being formed.

The stretching and blowing rod 32 is mounted slidably in the blowing nozzle 54 and is secured at its lower end to actuating means 62. Two O-rings 64 surround the blowing and stretching rod 32, ensuring sealing of the blowing chamber 59. The blowing nozzle 54 is guided in its vertical movement by guide members (not shown) secured to the stretching and blowing device 12.

The actuating means 62 comprise a connecting element 68 in the form of a carriage mounted slidably along the chassis 1 and driven vertically by a notched pulley 69 secured to the carriage and stretched between two pulleys 70, 71. The pulley 71 is driven by a servo-motor 72 controlled by an electronic control installation 73 from which it receives control signals $U_C, N_C, I_C$, and toward which it transmits return signals $S_M$, $I_M$ to form a control loop.

Figure 3:
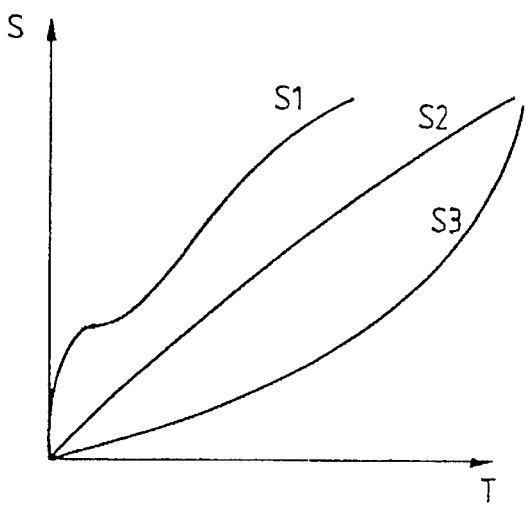
FIGS. 3 to 5 show diagrams of the curves of the stretching path, of the stretching force, and respectively of the blowing pressure, as a function of time.
Figure 4:
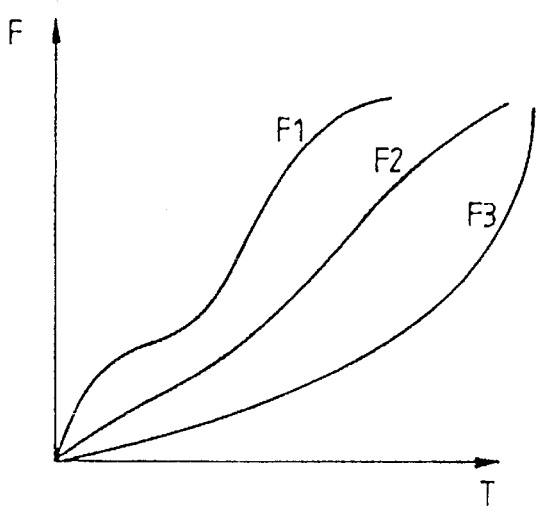

The advantage of such an installation 73 is to be able to program and control the process of transformation of a preform into a bottle. It is thus possible to pre-program the curves, functions or laws of stretching and then to execute them. These stretching curves relate the path of stretching S as a function of time T. FIG. 3 shows three examples of such curves $S_1, S_2, S_3$. The installation 73 is also arranged to make the stretching force or the resistance to stretching F, measured for example by means of the motor couple, variable as a function of time. Three examples of control curves $F_1, F_2, F_3$ are shown in FIG. 4.

Thus, the electronic control installation 73 emits voltage control signals $U_C$, of a frequency $N_C$ and/or of current $I_C$, toward the servo-motor 72, which returns corresponding signals either as to the path, at the position $S_M$ of the stretching rod 32, or current signals $I_M$ corresponding to the resistance to stretching F. In this servo-adjustment loop 75, the control signals $U_C$, $N_C$ or $I_C$ sent to the servo-motor 72 are determined such that the stretching path S or the resistance to stretching F in time T, corresponds to one of the preprogrammed curves, functions or laws.

It is to be noted that in the processes for moulding by stretching and blowing, one must distinguish two principal phases. During a first phase, so-called pre-blowing, the receptacle in the course of formation is subjected to expansion to about 90% of the final volume. During this phase, the quality and the regularity of the thickness of the wall of the receptacle are determined. The blowing pressures P are equal to or less than 15 bars. This phase is followed by a final blowing phase during which the final shape is given to the receptacle. The blowing pressures are then higher, generally comprised between 16 and 40 bars.

Thus, it is possible to pre-program, to control and to carry out by means of the electronic control installation 73, curves of pressure increase and to send the variable control signals $U_1$ to control the operation of the servo-valve 60 which returns return signals $U_2$. This control loop 76 thus permits carrying out and following the predetermined programmed curves, such as those $P_1, P_2, P_3$ shown in FIG. 5.

Figure 5:
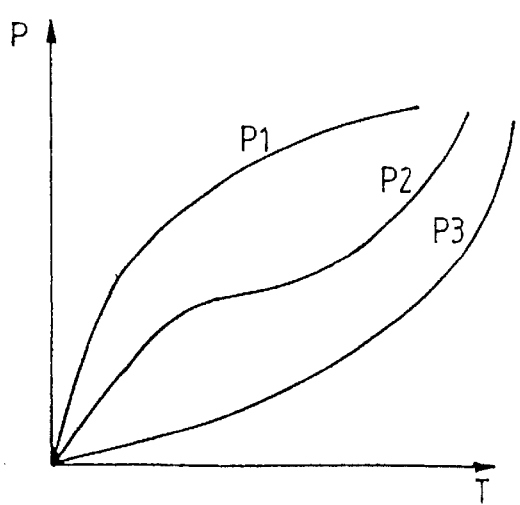

The control installation is also arranged so as to permit a combination of the two control means or loops 75 and 76, namely for example a combination of the curves of FIG. 5 with those of FIG. 3 or 4. There can thus be controlled the pre-blowing pressure as a function of the path of stretching S and/or as a function of the resistance F exerted on the stretching rod.

Figure 6A:
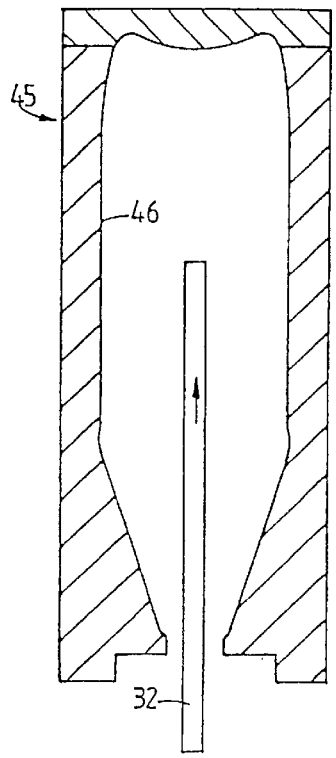
FIGS. 6A to 6C and 7A to 7C show schematically the calibration operations as to the maximum path, respectively at the initial position of the stretching rod.
Figure 6B:
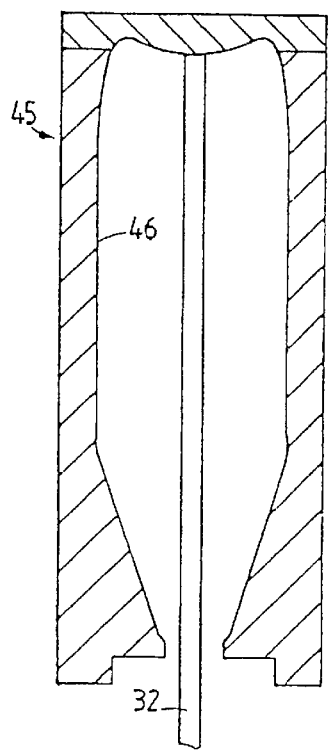
Figure 6C:
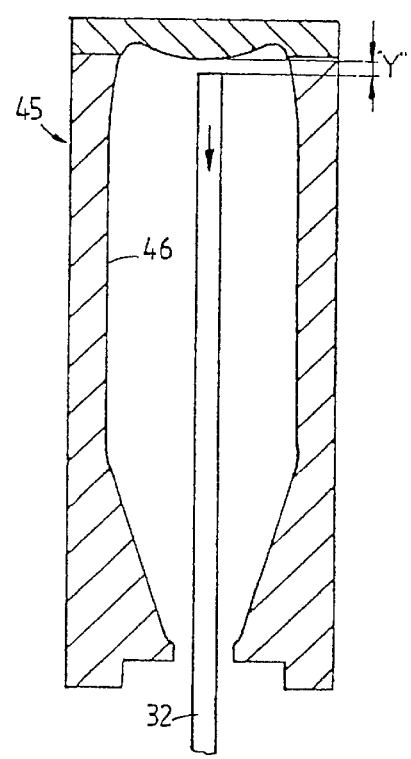

The electronic control installation 73 is also arranged so as to carry out a calibrating operation of the maximum path of the stretching rod, according to the length of the mould cavity 46 used upon each operation of the machine. In a first step, the rod 32 is advanced with slow speed, for example 2 cm per second (FIG. 6A), and stopped immediately when it enters into contact with the bottom of the mould cavity (FIG. 6B). During a second step, the rod 32 is then retracted a programmable distance Y, corresponding to the thickness of the wall of the bottom of the receptacle, for example 1 mm (FIG. 6C) and the path obtained is then recorded in the memory of the control installation 73. Thanks to this calibration operation, it is prevented that the stretching rod 32 would impact, during the stretching, the bottom of the mould cavity 46 and pierce the bottom of the produced receptacle. There is also avoided in a reliable manner damage to the moulding device 12 and to the produced receptacles. This calibration takes place in an automatic manner without it being necessary to carry out changes of members or manual adjustments.

Figure 7A:
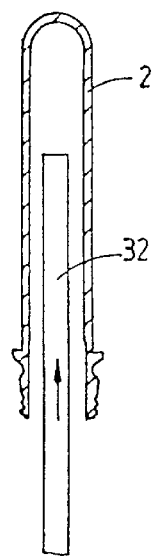
Figure 7B:
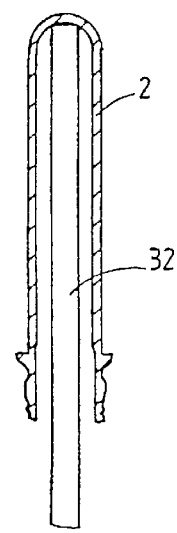
Figure 7C:
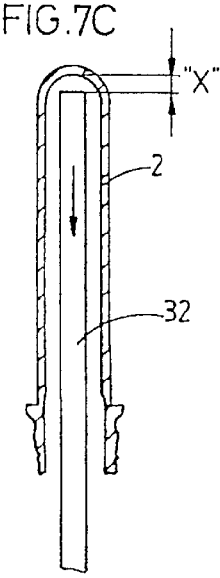

The electronic control installation 73 is moreover arranged such that it carries out another calibration operation of the path of positioning of the stretching rod 32 as a function of the length of the preform 2. The rod is thus raised at low speed, for example 2 cm/second, within the preform 2 (FIG. 7A). This displacement is immediately stopped when the bottom of the preform 2 is reached (FIG. 7B). The stretching rod is then retracted a predetermined programmable distance X, for example 2 mm, permitting to accommodate deformation and shrinkage of the preform after the heating (FIG. 7C). The path thus obtained is recorded in the memory of the control installation 73. Thanks to this second calibration operation, the initial positioning of the rod 32 is thus precisely determined such that a controlled contact at variable speed results at the beginning of stretching and such that damage of the preform 2 is avoided with certainty. This calibration operation takes place in an automatic manner, without it being necessary to change the members or to carry out manual adjustments. The calibration processes described and the installation relating thereto ensure high safety of production and considerable adaptability to all conditions of production.

Of course, the process and the embodiment described above are in no way limiting and can receive any desirable modification within the framework as defined by the invention. In particular, the motor 72 could be of any type, for example arranged as a linear motor carrying the stretching rod. This motor could for example drive two or three, or even more, stretching rods mounted on a cross-piece or a common carriage. The stretching operation predetermined and preprogrammed in the control installation 73 could take account of numerous other parameters, such as the temperature of the preforms or of the blowing fluid, of the relative humidity of the blowing fluid, etc. The valve 60 could be of any type and controlled by any other control signals of variable frequency or amplitude. Of course the support for the preforms, the moulding member and the blowing nozzle could have any other shape. According to one modification, the stretching rod could also be outside the preform, fixed to the summit of this latter and draw the preform upwardly into the moulding member. The curves shown in FIGS. 3, 4 and 5 could be quite different and could relate to other parameters, such as the blowing pressure P and/or the stretching force F as a function of movement, path S, temperature T and/or relative humidity, etc.

What is claimed is:

1. Process for the production of receptacles of plastic material by means of a machine comprising a chassis (1) and arranged along a transport path (20), at least one heating device (10) and a device (12) for moulding by stretching and blowing, the receptacles being formed from preforms (2) disposed on supports (7), the device (12) for moulding by stretching and blowing comprising a blowing member (54) connected to a source of fluid under pressure (58) by means of an electro-valve (60) and a stretching rod (32) adapted to be displaced by actuating means (69, 72) comprising a motor (72) connected to a control installation (73) comprising first regulating means (75) to program and control the displacement of the stretching rod (32) and second regulating means (76) to program and control the pressure increase (P) applied to the preforms (2), characterised by the fact that there is carried out by means of the control installation (73) a first calibration operation to determine the maximum path of the stretching rod (32) as a function of the length of the mould cavity (46) by advancing the stretching rod (32) to the bottom of the mould cavity and recording in the memory of the control installation the obtained path, decreased by the thickness of the bottom wall of the receptacle, and that there is carried out a second calibration operation to determine the path of positioning before stretching of the stretching rod (32) as a function of the length of the preform by advancing the stretching rod (32) to the bottom of the preform and by recording in a memory of the control installation a value depending on the positioning path and variations in the length of the preforms.

2. Process according to claim 1, characterised by the fact that there is carried out during the first calibration operation a first step during which the stretching rod (32) is advanced with reduced speed and stopped when it enters into contact with the bottom of the mould cavity (46) and a second step during which the rod is retracted by a first predetermined distance (Y) corresponding to the thickness of the bottom wall of the receptacle, the path thus obtained being recorded in the memory of the control installation (73).

3. Process according to claim 1, characterised by the fact that there is carried out during the second calibration operation a first step during which the stretching rod (32) is advanced with reduced speed within the preform (2) and stopped when it enters into contact with the bottom of the preform (2), and a second step during which the rod is retracted by a second predetermined distance (X) taking account of the deformations of the preform (2) after its heating, the path thus obtained being recorded in the memory of the control installation (73).

4. Machine for the production of receptacles of plastic material comprising a chassis (1) and arranged along a transport path (20), at least one heating device (10) and a device (12) for moulding by stretching and blowing, the receptacles being formed from preforms (2) disposed on supports (7), the device (12) for moulding by stretching and blowing comprising a blowing member (54) connected to a source of fluid under pressure (58) by means of an electro-valve (60) and a stretching rod (32) adapted to be displaced by actuating means (69, 72) comprising a motor (72) connected to a control installation (73) comprising first regulating means (75) to program and control the displacement of the stretching rod (32) and second regulating means (76) to program and control the pressure increase (P) applied to the preforms (2), characterised by the fact that the control installation (73) and its first regulating means are arranged so as to carry out a first calibration operation to determine the maximum path of the stretching rod (32) as a function of the length of the mould cavity (46) used, by advancing the stretching rod (32) to the bottom of the mould cavity and by recording in the memory of the control installation the path obtained, decreased by the thickness of the bottom wall of the receptacle, and to carry out a second calibration operation to determine the path of positioning before stretching of the stretching rod (32) as a function of the length of the preform, by advancing the stretching rod (32) to the bottom of the preform and by recording in a memory of the control installation a value depending on the positioning path and variations in the length of the preforms.

5. Machine according to claim 4, characterised by the fact that the first calibration operation comprises a first step during which the stretching rod (32) is advanced with reduced speed and stopped when it enters into contact with the bottom of the mould cavity (36), and a second step during which the rod is retracted by a first predetermined distance (Y) corresponding to the thickness of the bottom wall of the receptacle, the path thus obtained being recorded in the memory of the control installation (73).

6. Machine according to claim 4, characterised by the fact that the second calibration operation comprises a first step during which the stretching rod (32) is advanced with reduced speed within the preform (2) and stopped when it enters into contact with the bottom of the preform (2), and a second step during which the rod is retracted by a second predetermined distance (X) taking account of deformations of the preform (2) after its heating, the path thus obtained being recorded in the memory of the control installation (73).

7. Machine according to claim 4, characterised by the fact that the first regulating means (75) are adapted to predetermined a stretching function ($S_1$, $S_2$, $S_3$; $F_1$, $F_2$, $F_3$) setting at least one parameter (S,F) defining the stretching of the preform in relation to at least another parameter, advantageous the time, by the fact that the second regulating means (76) are adapted to predetermined at least one function ($P_1$, $P_2$, $P_3$) of pressure increase (P) and by the fact that the control installation (73) is adapted to provide a combination of said first and second regulating means (75, 76).

8. Machine according to claim 4, characterised by the fact that the first regulating means (75) of the control installation (73) are arranged so as to pre-program curves, functions and laws of stretching relating the stretching path (S) carried out by the stretching rod (32) and/or the stretching force (F) exerted by the stretching rod as a function of time (T) constituting said other parameter and then to carry out these stretching curves, functions and laws.

9. Machine according to claim 4, characterised by the fact that the second regulating means (76) are arranged so as to pre-program the curves, functions and laws of pressure increase as a function of time (T) and/or of the stretching path (S) and then to carry them out by means of the electro-valve (60).

10. Machine according to claim 7, characterised by the fact that the control installation (73) is arranged such that said combination of the first and second regulating means permits pre-programming the curves of pressure of pre-blowing and/or of blowing as a function of the path (S) or the position of the stretching rod (32) and/or of the stretching force (F) or of the resistance exerted on the stretching rod (32) and then to carry them out.

11. Machine according to claim 4, characterised in that the motor is a servo-motor (72) receiving from the control installation (73) signals of voltage ($U_C$), and/or of frequency ($N_C$) and/or of current ($I_C$) and sending toward the control installation (73) signals of current ($I_N$) and/or signals relating to the position ($S_M$) of the stretching rod (32).

12. Machine according to claim 4, characterised by the fact that the electro-valve is a servo-valve (60) receiving from the control installation (73) first voltage signals ($U_1$) and sending towards this installation second voltage signals ($U_2$).

\* \* \* \* \*